3,284,292
Patented Nov. 8, 1966

3,284,292

QUATERNARY SALTS OF AROMATIC DISULFONIC ACIDS AND THEIR USE FOR COMBATING PHYTOPATHOGENIC MICROORGANISMS

Otto Scherer, Bad Soden, Taunus, and Georg Schaeffer, Frankfurt am Main, Germany, assignors to Farbwerke Hoechst Aktiengesellschaft vormals Meister Lucius & Brüning, Frankfurt am Main, Germany, a corporation of Germany No Drawing. Filed Sept. 9, 1964, Ser. No. 395,307
Claims priority, application Germany, Sept. 10, 1963, F 40,714
7 Claims. (Cl. 167—30)

The present invention relates to processes for preparing salts of aromatic disulphonic acids with quaternary ammonium bases and to the use of such salts for combating phytopathogenic microorganisms.

According to the processes for preparing the new compounds there is first prepared an alkyl ester of an aromatic disulphonic acid, preferably benzene, which alkyl ester contains 10 to 18, preferably 12 to 16, carbon atoms. The preparation of the ester is brought about either (a) by reacting the corresponding aromatic disulphochloride with the corresponding alcohol in the presence of an acid binding agent or (b) by subjecting the corresponding aromatic disulphonic acid dialkyl ester whose alkyl groups each contain 1 to 6 carbon atoms, to an ester interchange reaction with an alcohol of the aforesaid kind and by reacting the ester thus obtained either (aa) with a tertiary amine of the general formula

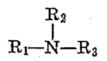

in which $R_1$, $R_2$ and $R_3$ each represent an alkyl group containing 1 to 4 carbon atoms or (bb) with a heterocyclic nitrogen base, preferably one of the group consisting of pyridine, quinoline, isoquinoline and their derivatives methylated and/or ethylated at the ring.

Alternatively, an alkyl ester of an aromatic disulphonic acid, preferably benzene, whose alkyl group contains 1 to 4 carbon atoms, can be reacted with a tertiary amine of the general formula

in which $R_2$ and $R_3$ each represent an alkyl group containing 1 to 4 carbon atoms and $R_4$ represents an alkyl group containing 10 to 18, preferably 12 to 16, carbon atoms.

The products obtained according to the present invention have the general formula

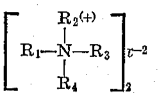

or

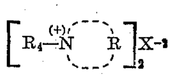

in which $R_1$, $R_2$, $R_3$ and $R_4$ have the meanings given above,

is monocyclic or bicyclic mono-nitrogen heterocycle, preferably one of pyridine, quinoline, isoquinoline or their derivatives methylated and/or ethylated at the ring, and $x^{-2}$ is the anion of a benzene disulphonic acid.

The reaction may proceed, for example, according to the following equation:

(I)

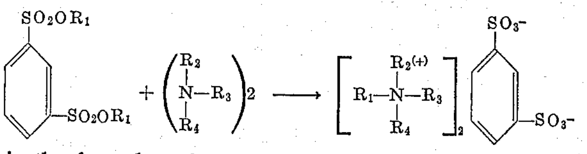

in the formulae of which $R_1$, $R_2$ and $R_3$ each represent alkyl group containing 1 to 4 carbon atoms and $R_4$ represents an alkyl group containing 10 to 18 carbon atoms. The reaction takes place already under mild conditions, temperatures within the range of 0° to 70° C., preferably 20° to 50° C., being sufficient.

It is also possible first to place the corresponding disulphonic acid ester containing alkyl groups with 10 to 18 carbon atoms ($=R_4$) into the reaction vessel and to react this ester with a tertiary amine of low molecular weight of the formula

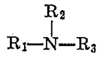

in which $R_1$, $R_2$ and $R_3$ each represents an alkyl group containing 1 to 4 carbon atoms, the reaction proceeding according to the following equation:

(II)

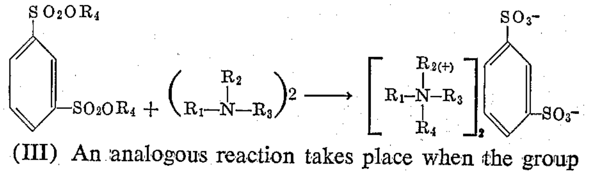

(III) An analogous reaction takes place when the group

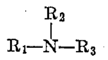

represents a heterocyclic ring system.

In the two latter cases the reaction is advantageously carried out at a temperature within the range of 40° to 160° C., preferably 70° to 130° C.

In most cases the reaction is brought about by mixing the reactants in a stoichiometric ratio. An excess of tertiary amine is not harmful. In principle it is not necessary to use a solvent. But solvents which have been recommended in literature for quaternisation reactions, for example acetone, nitromethane, nitrobenzene, benzene and toluene, may be used.

The higher dialkyl esters of aromatic disulphonic acids which take part in the above-mentioned reactions and in the formulae of which $R_4$ stands for alkyl groups containing 10 to 18 carbon atoms, have not yet been described. They can be prepared in various ways. One possibility is to react a corresponding aromatic disulphochloride in the presence of an acid-binding agent in known manner with an alcohol of the formula $R_4OH$, the reaction proceeding, for example, according to the following equation:

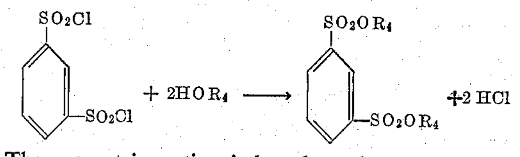

The present invention is based on the observation that the aforesaid esters can also be obtained in a good yield when the corresponding aromatic disulphonic acid dialkyl esters and an excess of an alcohol of the formula $R_4OH$ are subjected in vacuo to an ester interchange reaction in the presence of 0.1 to 10%, preferably 3 to 6%, of an aromatic sulphonic acid at a temperature within the range of 140° to 180° C., preferably 150° to 170° C., the reaction corresponding to the following equation:

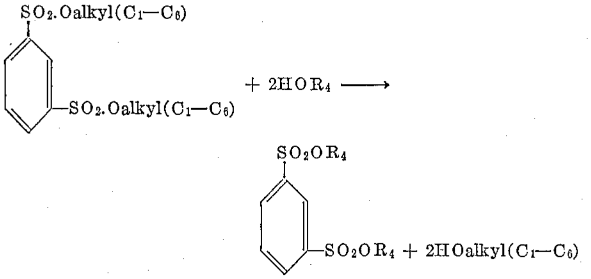

(ester interchange reaction in the presence of aromatic sulphonic acid).

According to the prior art (cf. Houben-Weyl, "Methoden der organischen Chemie," 1955, vol. 9, page 674) it was to be expected that in the reaction of sulphonic acid methyl esters with alcohols of the formula $R_4OH$ only the alkyl methyl ethers of the formula $R_4—OCH_3$ would be obtained.

The quaternary disulphonates obtained according to the present invention have a pronounced effect against phytopathogenic microorganisms. On the one hand, they have the advantage over the quaternary chlorides and bromides which have been described in literature that they are not phytotoxic in the concentrations in which they have to be used and, on the other hand, they are superior as fungicides, for example, to the quaternary benzene monosulphonates. The bis-(N-dodecyl pyridinium)-benzene-1:3-disulphonate is, for example, eight times as effective against brown rust of wheat as the N-dodecyl pyridinum benzene monosulphonate.

The following examples serve to illustrate the invention but they are not intended to limit it thereto, the parts being by weight.

EXAMPLE 1

*Benzene-1:3-disulphonic acid didodecyl ester.*—374 parts of n-dodecanol-(1), 202 parts of triethyl amine and 650 parts of acetone were placed in a vessel provided with stirrer and cooled to 0° C. A solution of 275 parts of benzene-1:3-disulphochloride in 160 parts of dried acetone was added in the course of 1 hour at a temperature within the range of 0° to 5° C. and the mixture was stirred for 2 hours at a temperature within the range of 5° to 10° C. Then 1600 parts of methanol were introduced, the product which had precipitated was filtered off and washed with methanol until the filtrate was free from chlorine ions. After drying, 487 parts of benzene-1:3-disulphonic acid didodecyl ester having a melting point within the range of 64° to 65° C. were obtained.

EXAMPLE 2

*Benzene-1:3-disulphonic acid didodecyl ester.*—27 parts of benzene-1:3-disulphonic acid dimethyl ester, 500 parts of n-dodecanol-(1) and 1.5 parts of p-toluene sulphonic acid were heated to 140° C. under a pressure within the range of 12 to 15 mm. of mercury. Within 4 to 5 hours the temperature was raised to 170° C. The volatile portions were then removed under a pressure of 0.1 mm. of mercury and the residue was recrystallized from carbon tetrachloride. 43 parts of benzene-1:3-disulphonic acid diododecyl ester of a melting point of 62 to 63° C. were obtained.

EXAMPLE 3

*Bis - (N - dodecyl pyridinium) - benzene - 1:3-disulphonate.*—115 parts of the ester obtained according to Example 1 or 2 were heated to 90° C. 31.6 parts of pyridine were added within 1 hour, while stirring and while the temperature was increased to 130° C. Stirring was then continued for 2 hours at 130° C. and the crystalline reaction product which had been cooled was washed with dry ether or dry, cold acetone. The bis-(N-dodecyl pyridinium)-benzene-1:3-disulphonate melting at 100 to 105° C. was obtained in a practically quantitative yield.

EXAMPLE 4

*Bis - (N - hexadecyl pyridinium) - benzene - 1:3 - disulphonate.*—The experiment described in Example 3 was repeated under the same conditions, the only difference being that instead of the benzene-1:3-disulphonic acid didodecyl ester 136 parts of benzene-1:3-disulphonic acid dihexadecyl ester were used. Bis-(N-hexadecyl pyridinium)-benzene-1:3-disulphonate was obtained.

EXAMPLE 5

*Bis - (N - dodecyl quinolinium) - benzene - 1:3 - disulphonate.*—58 parts of the ester obtained according to Example 1 or 2 and 30 parts of quinoline were heated for 5 hours to 100° C. The excess of quinoline was distilled off in vacuo. After recrystallizing the residue from 600 parts of acetone, bis-(N-dodecyl quinolinium)-benzene-1:3-dislphonate which had a melting point within the range of 75° to 78° C. was obtained in a yield of 60%.

EXAMPLE 6

*Bis - (N - dodecyl - isoquinolinium)-benzene-1:3-disulphonate.*—The process described in Example 5 was repeated under the same conditions, the only difference being that instead of 30 parts of quinoline 30 parts of isoquinoline were used. There was obtained the bis-(N-dodecyl isoquinolinium)-benzene-1:3-disulphonate which had a melting point of 62 to 65° C.

EXAMPLE 7

*Bis-(trimethyl dodecyl ammonium)-benzene-1:3-disulphonate.*—26.6 parts of benzene-1:3-disulphonic acid dimethyl ester were dissolved in 250 parts of acetone and 45 parts of dimethyl dodecyl amine were added dropwise. In order to terminate the exothermic reaction the mixture was heated for one hour under reflux. The mixture was then cooled, the product which had precipitated was filtered off under reduced pressure and washed with an abundant quantity of acetone. 63 parts of bis-(trimethyl dodecyl ammonium)-benzene-1:3-disulphonate melting at 306° to 308° C. were obtained.

EXAMPLE 8

Wheat plants in the 3-leaf stage were strongly infested with spores of brown rust (*Puccinia triticina* Erikss.) and 3 days after the infection they were treated with an aqueous suspension of a wettable powder which had the following composition:

50% of active substance (bis-(N-dodecyl pyridinium)-benzene-m-disulphonate),
20% of active silicic acid,
2% of polyvinyl alcohol,
2% of dialkyl naphthalene sulphonate,
5% of dry cellulose waste liquor,
21% of kaolin.

The active substance was applied in quantities of 200, 100, 50, 25 and 12.5 milligrams, respectively, per litre of spray liquor. All plants were sprayed uniformly until they were dripping wet. This procedure was carried out three times.

The known N-dodecyl pyridinium benzene sulphonate and a commercially available preparation based on zinc ethylene bisdithiocarbamate containing 80% of active substance served for comparison purposes. The quantities of active substance used were equal in each case. A number of untreated infested plants remained as controls.

A fortnight after the treatment the plants were examined for infestation with brown rust of wheat. Table I given below indicates the average results obtained in each case.

As can be seen from the table the compound according to the invention has a much better curative effect than the known N-dodecyl pyridinium benzene sulphonate, for when the claimed compound was used in a concentration of 200 milligrams per litre of spraying liquor the spores were completely destroyed and when it was used in a concentration of 12.5 milligrams per litre of spraying liquor infestation was reduced by more than 50%. The compound according to the invention is also much more effective than the commercially available preparation based on zinc ethylene bisdithiocarbamate.

sults obtained in each case from three parallel experiments are indicated in Table II.

As can be seen from Table II the known compounds have caused such a grave injury to the plants that they are not suitable for combating plant diseases. In contradistinction thereto the compound according to the invention is well tolerated by the plants and exerts a pronounced curative effect against powdery mildew of cereals and grasses which is even somewhat superior to that of the commercially available product which had been used for comparison purposes.

TABLE II

| | Infestation (percent) with powdery mildew of cereals and grasses with a concentration of active substance of— | | | | | Phytotoxic effect |
|---|---|---|---|---|---|---|
| Milligrams per litre of spraying liquor | 200 | 100 | 50 | 25 | 12.5 | |
| Active agent: | | | | | | |
| Bis-(N-dodecyl pyridinium)-benzene-m-disulphonate. | 0 | 0.5 | 7.8 | 26.5 | 34.2 | No injury. |
| N-dodecyl pyridinium chloride | (1) | 13.7 | 28.6 | 46.5 | 52.0 | Strongly phytotoxic. |
| N-dodecyl pyridinium bromide | (2) | ------- | 12.7 | 38.2 | 39.5 | Extremely phytotoxic. |
| 4:6-dinitroheptyl methyl phenyl crotonate. | 0 | 1.2 | 6.9 | 31.6 | 54.3 | Slight injury with high concentrations. |
| (Untreated controls) | 100 | 100 | 100 | 100 | 100 | |

[1] Plants destroyed. [2] Plants strongly injured and destroyed.

TABLE I

| | Infestation (percent) with brown rust of wheat after a fortnight with a concentration of active substance of— | | | | |
|---|---|---|---|---|---|
| Milligrams per litre of spraying liquor | 200 | 100 | 50 | 25 | 12.5 |
| Active agent: | | | | | |
| Bis-(N-dodecyl pyridinium)-benzene-m-disulphonate | 0 | 1.3 | 7.8 | 21.6 | 39.5 |
| N-dodecyl pyridinium benzene sulphonate | 12.7 | 54.3 | 86.2 | 100 | 100 |
| Zinc ethylene bisdithiocarbamate | 7.5 | 23.6 | 53.3 | 96.0 | 100 |
| (Untreated controls) | 100 | 100 | 100 | 100 | 100 |

EXAMPLE 9

Wheat plants in the 3-leaf stage were strongly infested with spores of powdery mildew of cereals and grasses (*Erysiphe graminis* D.C.) and treated three days after their infestation with aqueous suspension of a preparation having the following composition:

50% of active substance (bis-(N-dodecyl pyridinium)-benzene-m-disulphonate),
10% of dry cellulose waste liquor,
2% of polyvinyl alcohol,
1% of dialkyl naphthalene sulphonate,
17% of kaolin.

The active substance was used in concentrations of 200, 100, 50, 25 and 12.5 milligrams, respectively, per litre of spraying liquor. All plants were sprayed with the same amount of spraying liquor until they were dripping wet.

The known N-dodecyl pyridinium chloride and N-dodecyl pyridinium bromide, which were used in the same form as the compound according to the invention, and a commercially available mildew preparation based on 4:6-dinitro-2-heptyl methyl phenyl crotonate served for comparison purposes. The quantities of active substance used were equal in each case.

Seven days after the treatment the plants were examined with regard to their state of health and after a fortnight they were examined with regard to their infestation with powdery mildew of cereals and grasses. The average re-

EXAMPLE 10

Wheat plants in the three-leaf stage were treated with an aqueous suspension at a wettable powder which contained 50% of bis(N-dodecyl quinolinium)-benzene-1:3-disulphonate of the formula

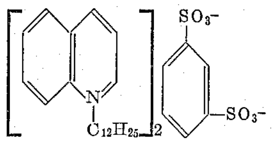

as active substance and 50% of inert material as carrier, wetting agent and adhesive. The wettable powder was applied in concentrations of 800, 400, 200, 100 and 50 milligrams, respectively, per litre of spraying liquor. The plants were sprayed until they were dripping wet.

A commercially available wettable powder based on zinc ethylene bisdithiocarbamate containing 80% of active substance served for comparison purposes, this compound being used in the same concentrations as above.

A fortnight after the treatment, the plants were strongly infested with spores of brown rust of wheat. After another fortnight, the plants were examined with regard to their infestation with brown rust of wheat (*Puccinia triticina* Erikss.).

As can be seen from the results given in Table III, the compound according to the invention has a very good fungicidal effect and even when applied in very low concentrations it reduces the infestation with brown rust of wheat by almost 50% whereas the compound used for comparison purposes is no longer effective when used in such low concentrations.

TABLE III

| | Infestation (percent) with brown rust of wheat with a concentration of active substance of— | | | | |
|---|---|---|---|---|---|
| Milligrams per litre of spraying liquor | 800 | 400 | 200 | 100 | 50 |
| Active agent: | | | | | |
| Bis-(N-dodecyl quinolinium)-benzene-1:3-disulphonate | 0 | 7.3 | 15.6 | 46.3 | 65 |
| Zinc ethylene bisdithiocarbamate | 1.5 | 16.5 | 57.2 | 83.2 | 100 |
| (Untreated controls) | 100 | 100 | 100 | 100 | 100 |

EXAMPLE 11

Barley plants in the three-leaf stage were treated with the aqueous suspension of a preparation which contained 50% of bis-(N-dodecyl isoquinolinium)-benzene-1:3-disulphonate of the formula

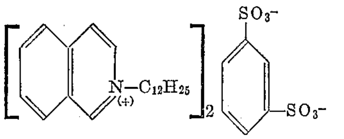

as active substance and 50% of inert materials such as wetting agents, adhesives and dispersing agents. The active substance was used in concentrations of 400, 200, 100 and 50 milligrams, respectively, per litre of spraying liquor.

A preparation based on 4:6-dinitro-2-sec.-butyl-phenyl dimethyl acrylate, a very effective, commercially available compound for combating mildew, served for comparison purposes. It was sprayed in the same concentrations and amounts as stated above.

A fortnight after the treatment the plants were infested with conidia of powdery mildew of cereals and grasses (*Erysiphe graminis* D.C.) and 21 days later they were examined with regard to their infestation with that fungus.

The result obtained by this examination is indicated in Table IV. It can be seen that the compound according to the invention which is free from nitro groups is just as effective as the compound which has been used for comparison purposes and which contains nitro groups.

TABLE IV

| Miligrams per litre of spraying liquor | Infestation (percent) with mildew with a concentration of active substance of— | | | |
|---|---|---|---|---|
| | 400 | 200 | 100 | 50 |
| Active agent: | | | | |
| Bis-N-(dodecyl isoquinolinium)-benzene-1:3-disulphonate | 0 | 0.6 | 7.8 | 23.6 |
| 4:6-dinitro-2-sec.-butyl phenyl dimethyl acrylate | 0 | 0 | 8.3 | 24.2 |
| (Untreated controls) | 100 | 100 | 100 | 100 |

EXAMPLE 12

Vine plants of the variety of "Silvaner" were treated in the 4-leaf stage with an aqueous suspension of a preparation which contained 50% of bis-(N-hexadecyl pyridinium)-benzene-1:3-disulphonate of the formula

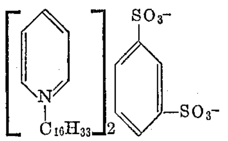

as active substance and 50% of inert materials such as wetting agents, adhesives and dispersing agents. The active substance was used in concentrations of 100, 50, 25 and 12.5 milligrams, respectively, per litre of spraying liquor. After the layer of active substance had dried the plants were strongly infested with zoosporangies of *Peronospora viticola* and placed for 4 hours in a moist chamber.

A preparation based on zinc ethylene bisdithiocarbamate was used for comparison purposes, the active substance being applied in the same concentrations as above.

Seven days after the plants had been contacted with peronospora they were examined for infestation. The result is indicated in Table V. It can be seen from the table that the compound according to the invention leads to a pronounced reduction of infestation which is entirely equal to that of the compound used for comparison purposes.

TABLE V

| Milligrams per litre of spraying liquor | Infestation (percent) with Peronospora with a concentration of active substance of— | | | |
|---|---|---|---|---|
| | 100 | 50 | 25 | 12.5 |
| Active agent: | | | | |
| Bis-(N-hexadecyl pyridinium)-benzene-1:3-disulphonate | 0.8 | 16.5 | 27.5 | 54.3 |
| Zinc ethylene bisdithiocarbamate | 1.2 | 21.4 | 36.5 | 51.7 |
| (Untreated controls) | 100 | 100 | 100 | 100 |

EXAMPLE 13

Wheat plants in the 3-leaf stage were treated with an aqueous suspension of a wettable powder which contained 50 parts of the claimed compound bis-(trimethyl dodecyl ammonium)-benzene-1:3-disulphonate as active substance and 50 parts of wetting agent, adhesive and dispersing agent as inert materials. The active substance was applied in concentrations of 400, 200, 100, 50 and 25 milligrams, respectively, per litre of spraying liquor. One day after the treatment the plants were strongly infested with spores of brown rust and after an incubation period of a fortnight they were examained for infestation.

A commercially available wettable powder based on zinc ethylene bisdithiocarbamate served for comparison purposes, the active substance being applied in the same concentrations as above. A number of untreated wheat plants remained as controls. The result of the examination for infestation is indicated in the table given below. As can be seen from that table the compound according to the invention has a pronounced effect against brown rust of wheat, which is even somewhat superior to that of the compound used for comparison purposes.

TABLE VI

| Milligrams per litre of spraying liquor | Infestation (percent) with brown rust of wheat after a fortnight with a concentration of active substance of— | | | | |
|---|---|---|---|---|---|
| | 400 | 200 | 100 | 50 | 25 |
| Active agent: | | | | | |
| Bis-(trimethyl dodecyl ammonium)-benzene-1:3-disulphonate | 0 | 2.8 | 18.5 | 31.6 | 71.5 |
| Zinc ethylene bisdithiocarbamate | 0 | 4.5 | 20.6 | 46.5 | 80.3 |
| (Untreated controls) | 100 | 100 | 100 | 100 | 100 |

We claim:

1. Compound of the formula

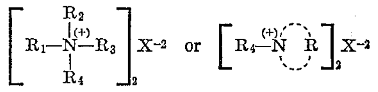

in which $R_1$, $R_2$ and $R_3$ represent alkyl groups of 1 to 4 carbon atoms, $R_4$ represents an alkyl of 10 to 18 carbon atoms,

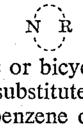

represents a monocyclic or bicyclic mononitrogen heterocycle or a lower alkyl substituted derivative thereof, and $X^{-2}$ is the anion of a benzene disulfonic acid.

2. Bis-(N-dodecyl pyridinium)-benzene-1:3-disulphonate.

3. Bis-(N-hexadecyl pyridnium)-benzene-1:3-disulphonate.

4. Bis-(N-dodecyl quinolinium)-benzene-1:3-disulphonate.

5. Bis-(N-dodecyl isoquinolinium)-benzene-1:3-disulphonate.

6. Bis-(trimethyl dodecyl ammonium)-benzene-1:3-disulphonate.

7. The combating of phytopathogenic microorganisms, which comprises treating the habitat of said microorganisms on plants with a preparation containing as a pesticide a compound defined in claim 1 in conjunction with conventional adjuvants for pesticidal formulations and in a concentration which is harmful to the phytopathogenic microorganisms.

References Cited by the Examiner

UNITED STATES PATENTS

| | | | |
|---|---|---|---|
| 3,092,547 | 6/1963 | Coker et al. | 260—567.6 X |
| 3,097,132 | 7/1963 | Wiegand | 167—30 |
| 3,198,746 | 8/1965 | Baizer | 260—567 X |
| 3,200,143 | 8/1965 | Copp | 260—501 |

OTHER REFERENCES

Cary et al., J. Organic Chem., vol. 1, pages 284–5 (1936).

Emling, J. Am. Chem. Soc., vol. 74, pages 4702–3 (1952).

ALEX MAZEL, *Primary Examiner.*

HENRY R. JILES, DONALD G. DAUS, *Assistant Examiners.*